United States Patent [19]
Arnarson et al.

[11] Patent Number: 5,229,840
[45] Date of Patent: Jul. 20, 1993

[54] APPARATUS AND METHOD TO MEASURE AND MONITOR THE COATING OF OBJECTS

[75] Inventors: Hordur Arnarson; Petur Gudjonsson, both of Reykjavik, Iceland

[73] Assignee: Marel H.F., Reykjavik, Iceland

[21] Appl. No.: 783,069

[22] Filed: Oct. 29, 1991

[30] Foreign Application Priority Data

May 28, 1991 [IS] Iceland ............................ 3709

[51] Int. Cl.$^5$ ............................................. G01B 11/06
[52] U.S. Cl. ........................................ 356/381; 256/379
[58] Field of Search ........................ 356/379, 380, 381

[56] References Cited

U.S. PATENT DOCUMENTS

| | | | |
|---|---|---|---|
| 3,187,185 | 6/1965 | Milnes | 356/381 |
| 4,053,234 | 10/1977 | McFarlane | 356/381 |
| 4,456,379 | 6/1984 | Schumann et al. | 356/381 |
| 4,661,985 | 4/1987 | Akutsu | 356/380 |

FOREIGN PATENT DOCUMENTS 205505 8/1988 Japan ............................ 356/379

Primary Examiner—Richard A. Rosenberger
Attorney, Agent, or Firm—Cushman, Darby & Cushman

[57] ABSTRACT

An apparatus and method to measure, monitor control the coating of objects in a processing line including a camera to receive an image of the profile of the object before being coated, a second camera to receive an image of the profile of the object after being coated, and a means and method to compare the two images to determine the increase in volume of the object due to the coating. The comparing means is a microcomputer which calculates the increase in volume based on the two images, the speed of the object travelling along the processing line, and a form factor. The microprocessor compares the increase in volume of one object to the increase in volume of a second object to monitor and ensure a consistent coating thickness.

28 Claims, 2 Drawing Sheets

APPARATUS AND METHOD TO MEASURE AND MONITOR THE COATING OF OBJECTS

BACKGROUND OF THE INVENTION:

The present invention concerns an apparatus and method to measure the coating of objects which are dipped into a coating bath, or coated or sprayed by some other method. The coating of foods, for example, is employed extensively, with the aim of both increasing storage life and as part of processing food for the consumer's table. Coating with ice is used extensively as a preservation method for seafood products, e.g. shrimp. Shrimp are passed through a water spray and then chilled so that a thin layer of ice forms on their surface. This ice coating increases the storage life of the shrimp. As part of the full processing of various other foods, food portions are frequently coated with batter, breadcrumbs, oil, and other substances so that they are ready to be cooked without further preparation.

Naturally it is important in these processes that the coating should be of a certain consistent thickness, neither too thick nor too thin, to maximize utilization of the coating material and to provide the consumer with a consistently high quality product.

SUMMARY OF THE INVENTION

It is the aim of the invention to present an apparatus and method to measure and/or monitor the coating of foods, and other items.

Before objects, e.g. fish portions, are coated, a picture of the profile of each object is taken with a camera located in a particular relation to the object. The camera then sends the visual data by electronic means to a microprocessor. After the object is coated, a second picture is taken and the camera sends the visual data to the microprocessor. The second image is then electronically compared to the first image in order to calculate the amount of coating on the object. The amount of coating on one object is then compared to the amount of coating on a second object determined in the same manner. Thus the amount of coating applied to the objects passing through the processing line is monitored for consistency.

DETAILED DESCRIPTION OF THE PREFERRED EMBODIMENTS

Figure 1:
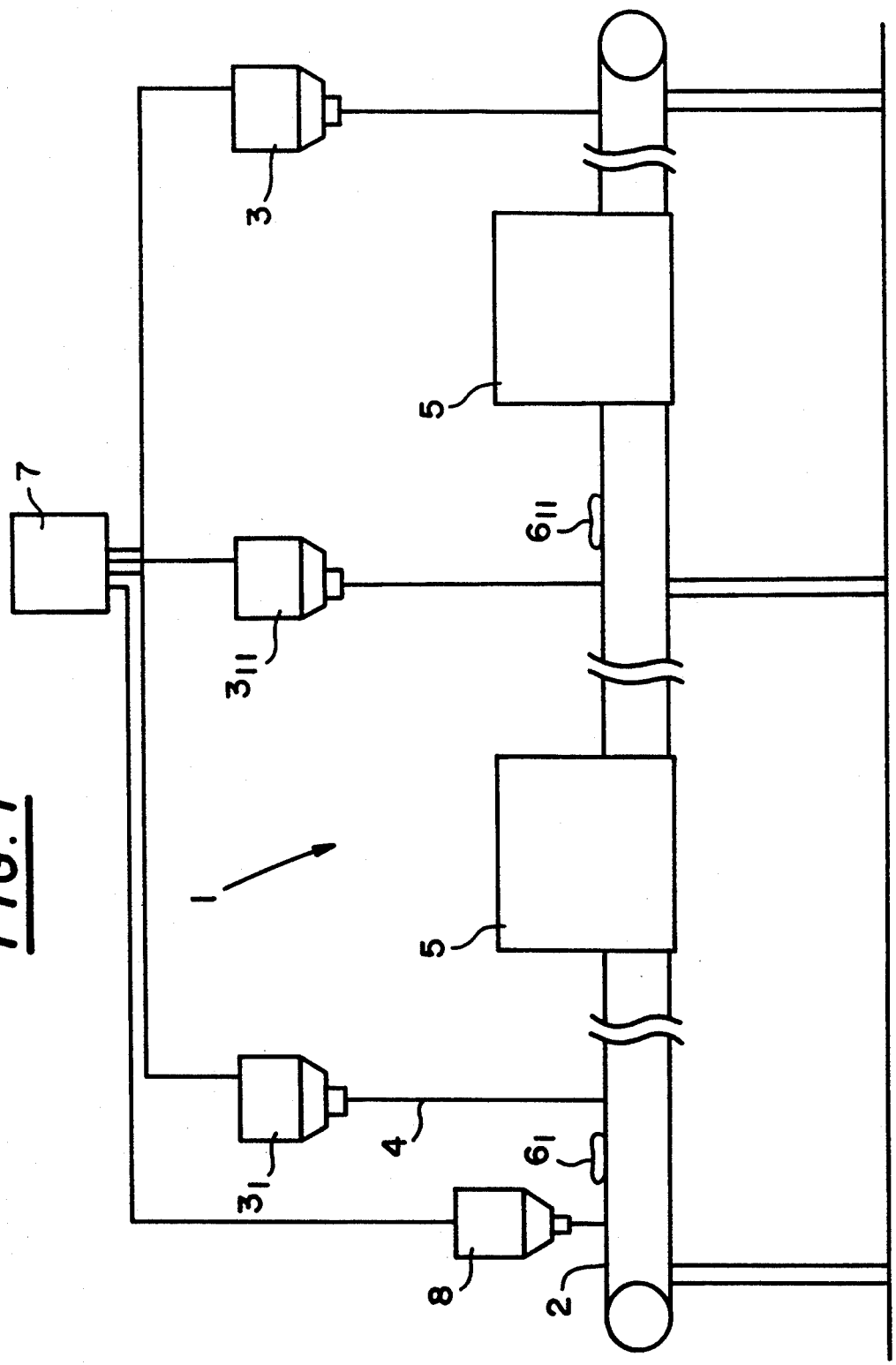
FIG. 1 is a schematic illustration of one embodiment of the present invention.
Figure 2:
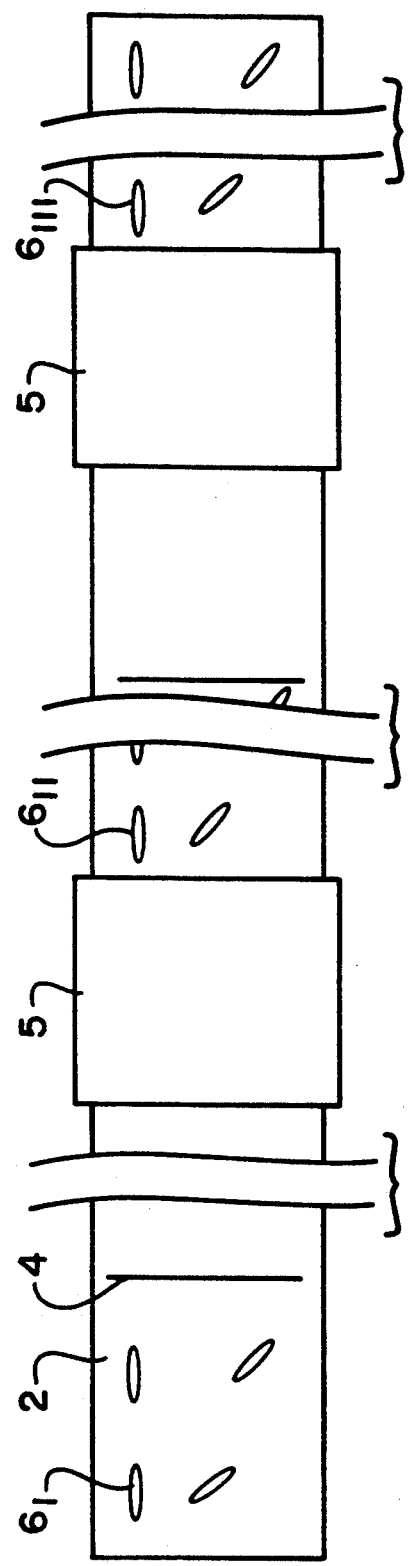
FIG. 2 is a top plan view of FIG. 1.

The invention will now be described in greater detail with reference to the accompanying diagrams which represent the preferred embodiment of the invention.

An object $6_1$ is moved before a first camera $3_1$ by means of a conveyor belt 2. The object then passes through a coating bath 5, following which it passes before a second camera $3_{11}$. The cameras are located in such a way that their position relative to the object on the conveyor belt before and after coating are identical. The cameras are of a line scan type which scans one line 4 at a time at right angles to the direction of movement of the object. The first camera captures an image of the profile of the object $6_1$ before being coated and the second camera captures an image of the profile of the object $6_{11}$ after being coated. The images are then sent to a microprocessor 7 which measures the area $A_1$ of the profile of the object in the first image and area $A_2$ of the profile of the object in the second image. The microprocessor continuously monitors the speed of the conveyer belt, with a belt speed detection device 8, to compensate for the effect of speed changes on the accuracy of area measurements. The microprocessor also controls the sampling frequency of the cameras on the basis of the speed of the belt. Additional cameras 3 and coating baths 5 can be used to increase the accuracy and control of the coating process.

The microprocessor calculates the change in volume of the object based on the following method. Volume (V) of the object can be estimated on the basis of the area measurements $A_1$ and $A_2$, and previously known data on the form of the objects. For the first measurement, this is done according to the formula:

$$V_1 = K_1 \cdot A_1$$

where $K_1$ is a form coefficient of the object In the same way, for the second measurement, the following formula is used:

$$V_2 = K_2 \cdot A_2$$

The proportional increase in volume is thus:

$$V_2/V_1 = K_2 \cdot A_2 / K_1 \cdot A_1$$

In general, the form of objects does not change, or changes inappreciably, when they are coated, i.e.:

$$K_1 = K_2$$

Thus it is obtained that the proportional increase in volume is:

$$V_2/V_1 = A_2/A_1$$

Thus it is possible to use the invention to accurately measure the amount of coating of objects.

Because the two cameras are set in identical alignments relative to the conveyor belt, and because the proportional increase in area is measured, most inaccuracies of measurement are eliminated by taking the ratio of the two area measurements. This means that the area ratio is even more accurate than the simple area measurements.

It is often possible to carry out this measurement at many stages in the processing line. The volume ratio or increase in volume of one object is then compared to the increase in volume of the next object. This comparison serves to monitor the consistency of the thickness of coating applied to the objects. The object of the invention may be embodied in other ways differing only in detail from the exemplary invention shown and will fall equally under the scope of the protection being sought.

What is claimed is:

1. An apparatus for measuring the amount of coating applied to an object in a processing line comprising:
   means for moving an object along a processing line;
   a first camera located adjacent to said processing line prior to application of coating in a particular relation to said object for generating a first image of a profile of said object;
   a second camera located adjacent to said processing line after application of said coating in said particular relation to said object for generating a second image of a profile of said object; and means for comparing areas of the profile images recorded by said first and second cameras to determine the increase in volume of said object.

2. An apparatus according to claim 1 wherein said comparing means includes means for determining a ratio of the areas of the images recorded by said first and second cameras.

3. An apparatus according to claim 1 further comprising at least one additional camera disposed along said processing line to record images of objects after subsequent coatings.

4. An apparatus according to claim 1 wherein said comparing means includes a microprocessor whereby the images from the first and second cameras are electronically sent to said microprocessor which processes the data electronically to determine the amount of coating on said object.

5. An apparatus according to claim 4 wherein said microprocessor determines the amount of coating on said object on the basis of the images received from said cameras and also data concerning the speed of said object.

6. An apparatus according to claim 5 wherein the lines of view of the cameras are at right angles to the direction of movement of the object.

7. An apparatus according to claim 5 wherein said microprocessor determines the ratio of the areas of the images recorded by said first and second cameras.

8. A method for measuring the amount of coating applied to objects in a processing line comprising the steps of:

conveying an object of a certain profile and cross section at a certain speed;

recording a visual image of a profile of the object prior to being coated, with a first camera;

recording the visual image with a second camera of a profile of the object, after being coated; and determining the amount of coating on the object by comparing an area of each of the two images and determining the change in volume of the object.

9. A method according to claim 8 wherein:

said recording steps record the images with a camera electronically and send the electronic image data to a microprocessor, said determining step includes the steps of comparing the areas of the images using said microprocessor and determining the amount of the coating using said microprocessor.

10. A method according to claim 9 wherein said determining step includes the step of determining the speed of the object moving in the processing line.

11. A method according to claim 8 wherein said determining step includes the step of using at least one additional camera disposed along the processing line to record images of objects after subsequent coatings.

12. A method according to claim 8 wherein said step of recording visual images of the objects includes positioning the lines of view of the cameras at right angles to the direction of movement of the object.

13. A method according to claim 8 wherein said determining step includes the step of areas of one object to the ratio of areas of a determining a ratio of the areas of the images recorded by said first and second cameras.

14. An apparatus for monitoring the uniformity of the thickness of a coating applied to objects in a processing line comprising:

means for moving objects along a processing line;

a first camera located adjacent to said processing line prior to application of said coating in a particular relation to said objects for generating a first image of a profile of said objects;

a second camera located adjacent to said processing line after application of said coating in said particular relation to said objects for generating a second image of a profile of said objects;

means for comparing areas of the profile images recorded by said fist and second cameras to calculate the increase in volume of said objects; and means for comparing the increase in volume of one object to the increase in volume of subsequent objects.

15. An apparatus according to claim 14 wherein said image comparing means includes means for determining a ratio of the areas of the images recorded by said first and second cameras.

16. An apparatus according to claim 15 wherein said image comparing means includes means for determining the difference between the ratio of areas of one object to the ratio of areas of a subsequent object, said comparison occurs continuously to monitor and ensure a consistent coating on the objects.

17. An apparatus according to claim 14 further comprising at least one additional camera disposed along said processing line to record images of objects after subsequent coatings.

18. An apparatus according to claim 14 wherein both said comparing means include a microprocessor whereby the images from the first and second cameras are electronically sent to said microprocessor which processes the data electronically to determine the amount of coating on said object.

19. An apparatus according to claim 18 wherein said microprocessor determines the difference between the ratio of areas of one object to the ratio of areas of a subsequent object, said comparison occurs continuously to monitor and ensure a consistent coating on the objects.

20. An apparatus according to claim 18 wherein said microprocessor determines a ratio of the areas of the images recorded by said first and second cameras.

21. An apparatus according to claim 14 wherein said microprocessors determines the amount of coating on said object on the basis of the images received from said cameras and also data concerning the speed of said object.

22. An apparatus according to claim 14 wherein the lines of view of the cameras are at right angles to the direction of movement of the object.

23. A method for monitoring the uniformity of a coating applied to objects in a processing line comprising the steps of:

conveying an object of a certain profile and cross section at a certain speed;

recording a visual image of a profile of the object prior to being coated, with a first camera;

recording with a second camera the visual image of a profile of the object, after being coated;

determining the amount of the coating by comparing areas of the two images and determining the change in volume of the object;

comparing the amount of coating of one object to the amount of coating of a subsequent object by performing the above steps of conveying, recording, and determining with a subsequent object and comparing the increase in said amount of one object to the increase in said amount of a subsequent object.

24. A method according to claim 23 wherein:

said recording steps record the images with a camera electronically and send the electronic image data to a microprocessor;

said determining step compares the areas of the images using a microprocessor and calculates the amount of the coating using said microprocessor; and said comparing step is performed by said microprocessor.

25. A method according to claim 23 wherein, said determining step includes the step of measuring the speed of the object moving in the processing line.

26. A method according to claim 23 wherein said determining step includes the step of using at least one additional camera disposed along the processing line to record images of objects after subsequent coatings.

27. A method according to claim 23 wherein both said recording steps include positioning the lines of view of the cameras at right angles to the direction of movement of the object.

28. A method according to claim 23 wherein said determining step includes the step of determining a ratio of the areas of the images recorded by said first and second cameras.

* * * * *